United States Patent [19]

Van Maren

[11] Patent Number: 4,672,646
[45] Date of Patent: Jun. 9, 1987

[54] DIRECT-INJECTION FIFO SHIFT REGISTER

[75] Inventor: David J. Van Maren, Fort Collins, Colo.

[73] Assignee: Hewlett-Packard Company, Palo Alto, Calif.

[21] Appl. No.: 908,051

[22] Filed: Sep. 16, 1986

[51] Int. Cl.[4] .............................................. G11C 7/00
[52] U.S. Cl. ........................................ 377/70; 377/66; 377/80
[58] Field of Search ....................... 377/66, 67, 69, 73, 377/80, 70

[56] References Cited

U.S. PATENT DOCUMENTS

| | | | |
|---|---|---|---|
| 3,212,009 | 10/1965 | Parker | 377/66 |
| 3,838,345 | 9/1974 | Schneider | 377/66 |
| 3,972,034 | 7/1976 | Derickson et al. | 377/67 |
| 4,058,773 | 11/1977 | Clark et al. | 377/66 |
| 4,156,288 | 5/1979 | Spandorfer | 377/70 |
| 4,293,919 | 10/1981 | Dasgupta et al. | 377/70 |

Primary Examiner—John S. Heyman
Attorney, Agent, or Firm—William E. Hein

[57] ABSTRACT

A FIFO shift register (100) includes a parallel data in-port (PIN) to each of its cells (101-132) and a means for managing input to determine for each cell whether it is to receive data and, if so, whether through its conventional serial in-port (SIN) or through its parallel in-port. The input manager comprises a bidirectional shift register of input manager cells arranged in one-to-one correspondence with data cells. A one-bit validity indicator stored within a given input manager cell is logically combined with asserted PUSH and PULL signals to determine the source of data for the associated data cell and its immediate successor. This arrangement not only provides greater speed by minimizing bubble-through time, but permits the FIFO shift register to be clocked. This capacity for synchronous operation permits ready VLSI implementation with concomitant advantages in economy, reliability and speed.

6 Claims, 4 Drawing Figures

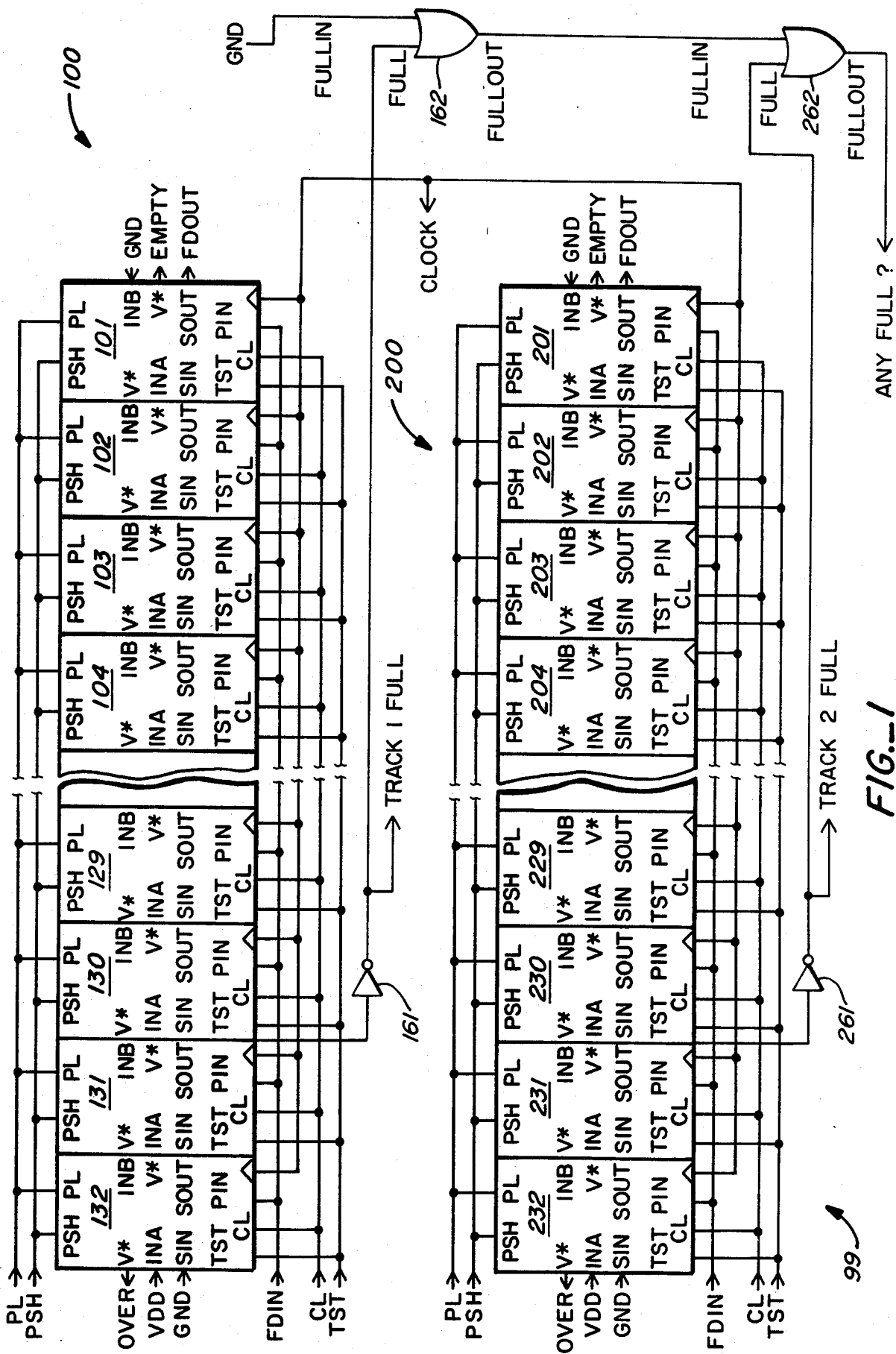
FIG._1

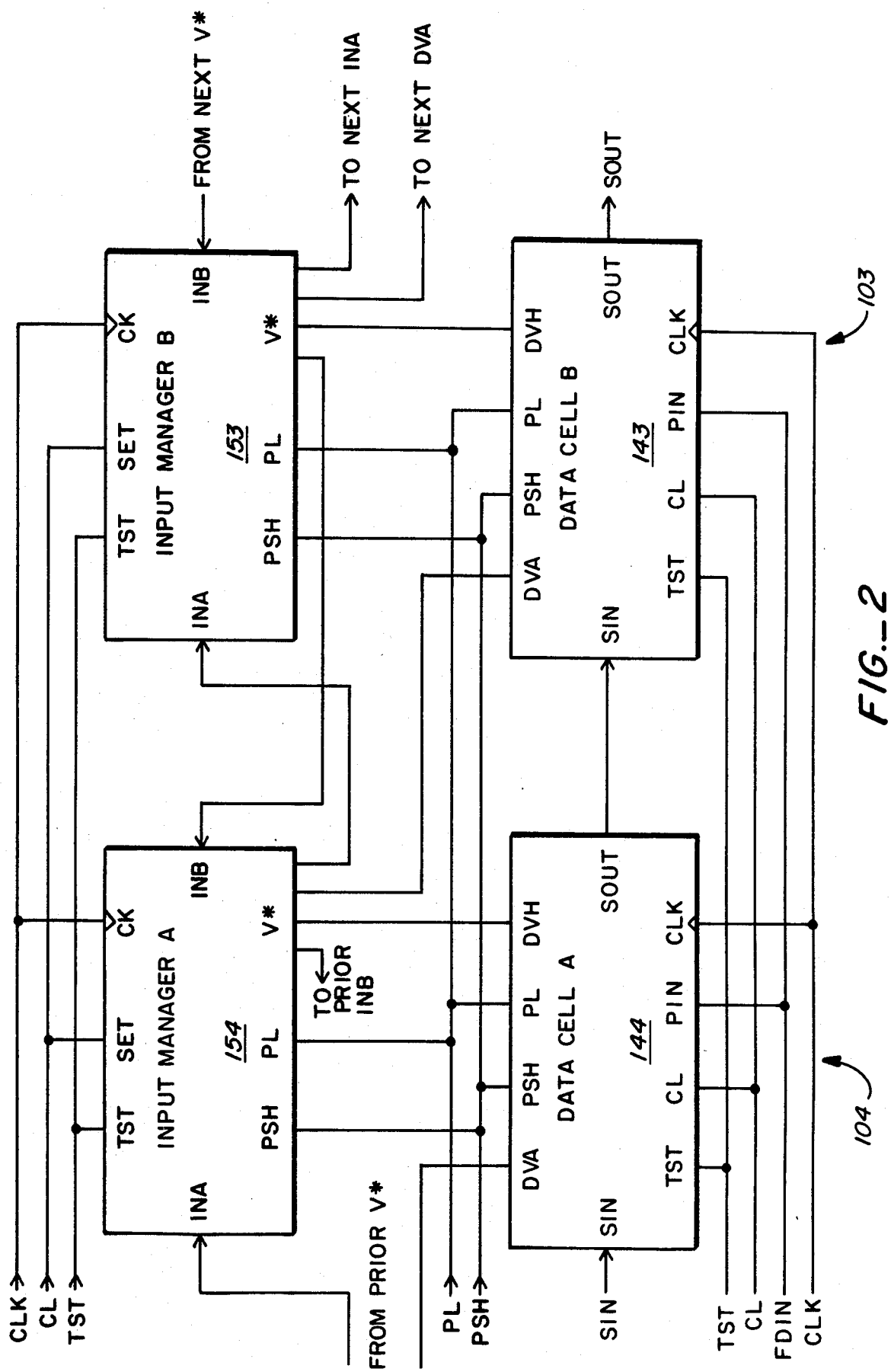
FIG._2

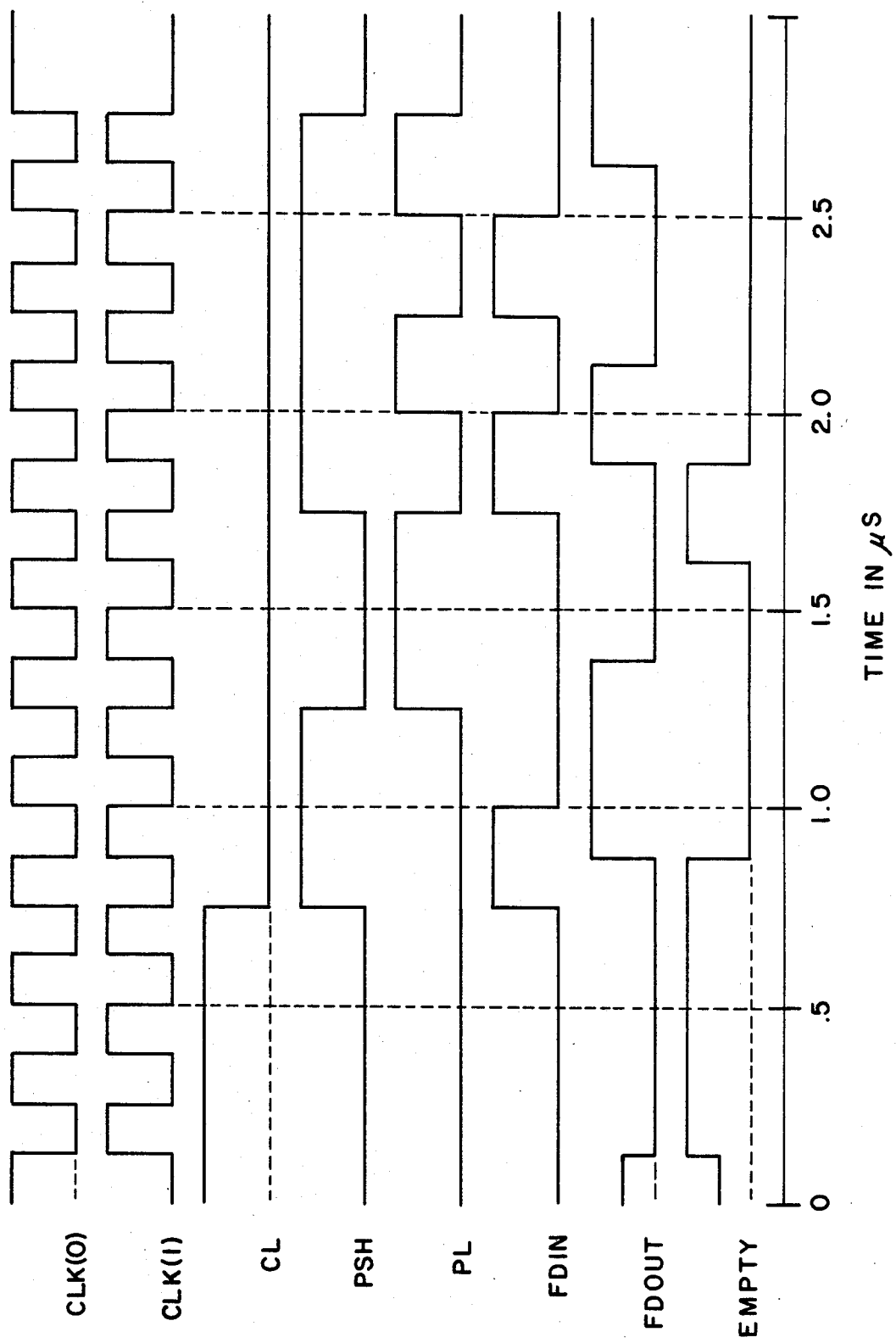
FIG._3

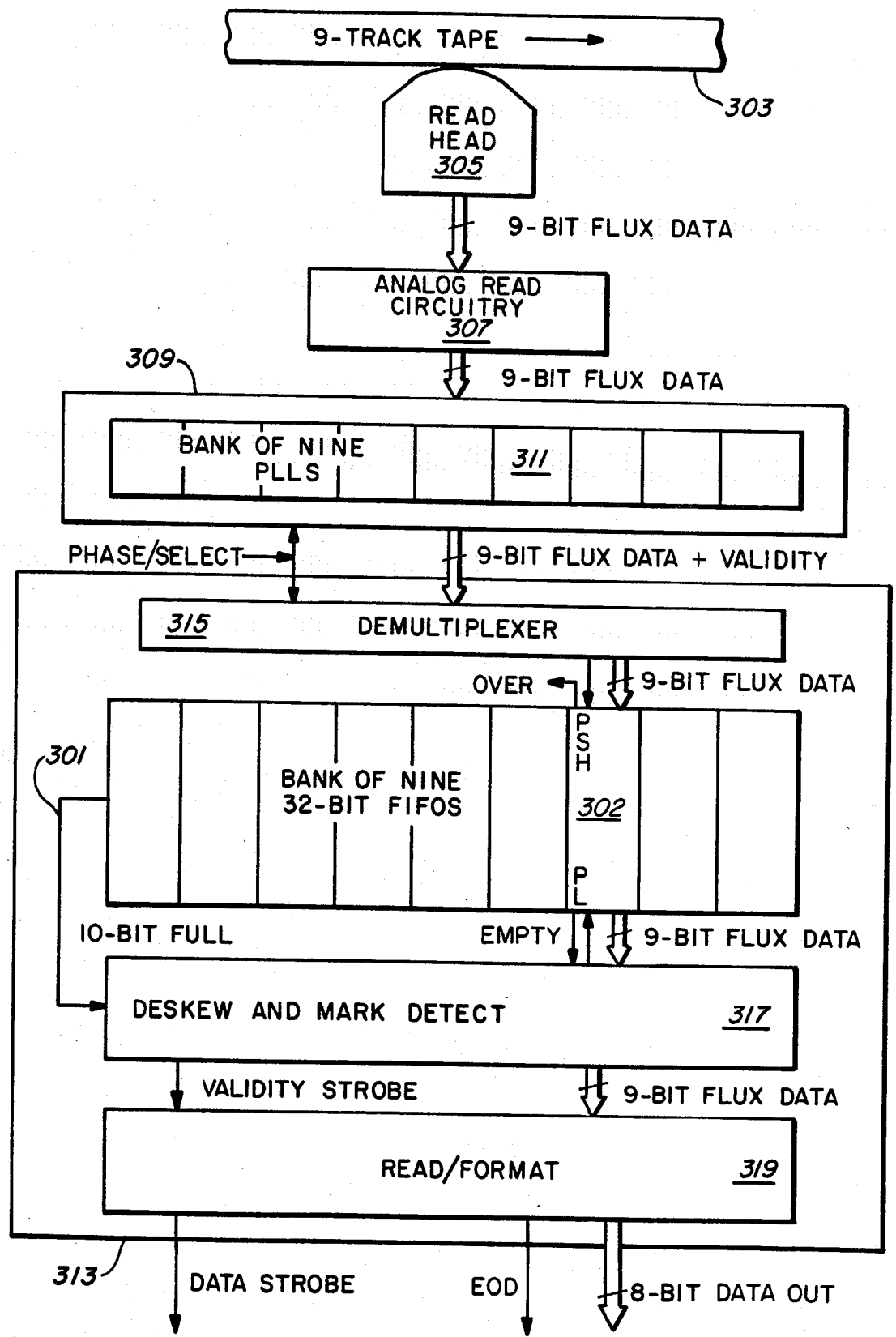
FIG._4

DIRECT-INJECTION FIFO SHIFT REGISTER

BACKGROUND OF THE INVENTION

The present invention relates to electronic read/write memories, and, more particularly to such memories that can operate as first-in/first-out (FIFO) shift registers.

Using the common vertical metaphor, a FIFO shift register includes a control section which directs input data to a data "top" cell. The "top" cell is more precisely characterized as the bottommost cell which is vacant, that is, without valid data; all cells below this "topmost" cell are occupied with data. In effect, such a FIFO is a variable length shift register, the length of which is always the same as the data stored within. Thus, when data is "pulled" from the FIFO, each data bit shifts down one cell, as does the top cell position.

FIFO shift registers are commonly used to buffer and interface between two systems with incommensurate timing characteristics. They are often included in devices such as tape recorders, electronic typewriters and word processors.

For example, FIFO shift registers can be used to interface the analog and digital subsystems of the read circuitry in a high-performance tape drive system. In such a system, data is typically recorded as on parallel tracks of flux levels on a magnetic tape. The tape is passed over a read head which converts the magnetic flux levels of each track into analog electrical signals. These analog electrical signals are then digitized and fed into read/format circuitry for decoding.

While the timing within the read/format circuitry can be precisely synchronized according to a system clock, it is not a trivial matter to coordinate this digital circuitry with the incoming analog signal tracks, and to coordinate the individual signal tracks with each other. The timing of the data in the form of flux reversals on the tape is subject to the vagaries of mechanical speed fluctuations, tape or head misalignment, and tape deformation. Thus, the individual data tracks can be skewed with respect to each other and generally bear no intrinsic relation to the synchronization governing the read/format circuitry.

In order to interface the analog and digital circuits, each track can be processed by a phase locked loop, a FIFO shift register and de-skew circuitry. Each phase locked loop samples and assigns digital values to segments of the incoming analog signal. The phase locked loop also determines which samples are valid, i.e. represent a single bit of data, rather than a transition between two bits. In accordance with such determination, the phase locked loop determines when "push" commands are issued for the FIFO to accept a data input. The de-skew circuitry looks for certain timing marks written into the data tracks and can issue or withhold "pull" commands which withdraw data from the FIFO and cause the contents to shift down. Thus, the FIFO shift registers serve to buffer the interface between the analog and digital subsystems of the read circuitry.

However, available FIFO shift register designs can constrain system performance due to cost, reliability and speed limitations. Most of these limitations are related to the difficulty of implementing current FIFO designs in very large scale integrated (VLSI) circuits. VLSI technology provides for very cost effective manufacture of complex circuits. This translates into significant savings with respect to simple circuits that can be integrated into a larger system implemented on a VLSI device. Likewise, a circuit included in a VLSI device can obtain speed advantages due to the short electrical paths involved and reliability advantages due to the minimization of separate interfacing manufacturing steps.

However, the reliability of VLSI devices is dependent on the manufacturer's ability to discard defective devices. This, in turn, requires that the designs implemented in VLSI be readily testable. Testability is in large part dependent on the design being entirely synchronous.

Thus, intelligent circuit design involves integrating circuits synchronized to a common clock on a monolithic device, such as a read/format chip, while leaving asynchronous components off. Thus, it can be said that a synchronization boundary limits which devices can take advantage of VLSI. Available FIFO shift register designs are asynchronous and thus must lie outside a synchronization boundary. Likewise, components separated from a synchronous subsystem by such a FIFO shift register are outside the synchronization boundary so that it is difficult to obtain advantages by integrating them into a main system chip.

Thus, current FIFO shift register designs cannot reliably take advantage of VLSI technology; this limitation extends to other components, e.g., those upstream from a FIFO shift register in tape recorder read circuitry. A related disadvantage is that it is difficult to coordinate the operation of FIFOs arranged in parallel, as is often the case in tape drive read circuitry. In addition, FIFO shift registers can delay system operation during the time it takes for a data bit to "bubble-through" to the top cell. Thus, there is a need for a FIFO shift register, which provides for higher speed operation, integration into VLSI devices, and coordination with other FIFO shift registers arranged in parallel.

SUMMARY OF THE INVENTION

A FIFO shift register includes means for directly injecting an input into any selected cell. This avoids the delays due to bubble-through time, and, more importantly, permits the FIFO to operate synchronously. Thus, the present invention provides for a FIFO shift register that can be integrated into a monolithic VLSI device. Furthermore, the operation of such a FIFO shift register can be readily coordinated with the operation of similar devices arranged in parallel.

As with comparable conventional devices, the present FIFO shift register includes a serially arranged set of read/write memory cells. This set includes a FIFO bottom cell, from which data exits the FIFO, and which, if any data is held by the FIFO, holds a data bit. The set also includes a FIFO top cell, which only holds a valid data bit when the FIFO is full. Each cell other than the FIFO top cell has an associated predecessor cell, and each cell other than the FIFO bottom cell has an associated successor cell. Means are provided for each cell having an associated successor cell to transfer the former's contents to the latter.

In accordance with the present invention, each cell of the FIFO shift register can accept an input from a parallel data input line. Input manager means are provided for determining, for each cell, whether the next transfer is to be from a predecessor cell or from the parallel data input line. Each cell can be clocked to provide synchronous operation. Several such FIFO shift registers can be operated synchronously in parallel, as desired.

The input manager can be implemented as a series of input manager cells in one-to-one correspondence with the data cells. Each input manager cell stores a bit indicating whether the respective data cell includes valid data or not. This information is used to control input selection for the respective data cell, and its successor data cell, if any. The specific determinations are responsive to "push" and "pull" signal inputs to the FIFO shift register. Further details and advantages are apparent in view of the drawings and detailed description below.

BRIEF DESCRIPTION OF THE DRAWINGS

FIG. 1 is a schematic of a synchronous bank of two FIFO shift registers in accordance with the present invention.

FIG. 2 is a schematic showing two of the cells of one of the FIFO shift registers of FIG. 1.

FIG. 3 is a timing diagram for one of the FIFO shift registers in FIG. 1.

FIG. 4 is a block diagram of the read circuitry for a tape drive incorporating FIFO shift registers in accordance with the present invention.

DESCRIPTION OF THE PREFERRED EMBODIMENTS

A FIFO shift register bank 99 includes two FIFO shift registers 100 and 200, as illustrated in FIG. 1. Each FIFO shift register 100, 200 comprising a series of cells 101–132, 201–232. Flux data can be injected directly into each cell by means of flux data in (FDIN) lines which connect to parallel in-ports (PIN) of each cell. Additionally, the FIFO shift registers 100 and 200 can be driven by a common clock (CLOCK) for synchronous operation.

The operation of the FIFO shift registers 100 and 200 is explained in relation to the interaction between two adjacent cells 103 and 104, as detailed in FIG. 2. Cell 102 is the "next" cell referred to in FIG. 2, while cell 105 is the prior cell. Data flows toward cells with lower numbers, while the FIFO shift register fills towards the cells with higher numbers.

Cell 103 includes a data cell A 143 and an input manager cell A 153, and, correspondingly, cell 104 includes a data cell B 144 and an input manager cell 154. ("A" and "B" can be considered mnemonics for "above" and "below", respectively.) Each data cell 143, 144 includes ten ports. Conventionally, push (PSH), pull (PL), data input (SIN), data output (SOUT), clear (CL), and test (TST) ports are provided. In accordance with the present invention, clock (CLK), parallel in (PIN), data valid here (DVH) and data valid above (DVA) ports are also provided.

These additional ports are controlled, directly or indirectly by the input manager cells 153 and 154. For example, the value at the DVH port of data cell B 143 is the contents of input manager B 153, whereas the value at the DVA port of data cell B 143 is the same as the contents of input manager A 154. For any given data cell, the source of the next data bit to be stored is determined by the values at DVA and DVH in conjunction with received PSH and PL inputs. The source can be either the serial in (SIN) or the parallel in (PIN) of the cell.

When the clear (CL) signal is activated, all data cells are initialized to "0" and all input managers are initialized to "1". A "1" in an input manager cell is used to signify that the value stored by the associated data cell does not reflect valid data. Thus, the input managers store the complement of validity indicators, hence the denomination "V*". With qualification as detailed below, the effect of a "1" in the input manager is to cause the associated cell to accept data through its parallel in (PIN) rather than its serial in (SIN).

The input managers of a given FIFO shift register constitute a bi-directional shift register. A push, without a concurrent pull, causes the contents of this bi-directional shift register to shift up (or left, in FIGS. 1 and 2) one cell. For example, the "1" stored in input manager B 153 can be transmitted through its V* port to the INB port of input manager A 154. Conversely, a pull without a push causes a downward shift in input manager contents. For example, the "0" stored in input manager A 154 can be transmitted through its V* port to the INA port of input manager B 153. Concurrent pull and push signals result in no shift in input manager contents.

Referring to FIG. 1, the INB of bottom cell 101 is tied to ground. Thus, "0s" are drawn into the bidirectional shift register constituted by the input managers whenever a push without a pull is implemented. Thus, as data is stored in the FIFO shift register 100, the "1s" shift up, and "0s" fill the vacancies below. Correspondingly, the INA in-port of the top cell 132 is tied to a voltage high VDD, so that "1s" are input as the bidirectional shift register shifts down in response to pull commands. Note that the serial in (SIN) of this same top cell is tied to ground, so that, normally, the only data input to the FIFO is through the parallel in-ports (PIN).

This arrangement provides three alternative states for the bi-directional shift register. First, all input managers can store "1s", signifying that there is no valid data in the FIFO shift register, as is the case at initialization. Second, all input managers can store "0s"; this signifies that an overflow could have occurred, and accordingly, the V* out-port generates an overflow (OVER) signal, which is treated as an error signal. Third, there can exist a boundary, or "top", above which all input managers are filled with "1s" and below which all input managers are filled with "0s". There are no other normal steady state possibilities.

Consider the case where input manager A 154 contains a "1" and input manager B 153 contains a "0", with reference to FIG. 2. If a push is issued, the "0" stored in input manager B 153 provides that the associated data cell B is not to accept new data from either of its in-ports. The "1" in input manager A 154, on the other hand, causes the associated data cell A 144 to accept a data input through its parallel in-port PIN. The push command also shifts the contents of the input managers one cell up so that both input managers illustrated in FIG. 3 would contain "0 s". Thus, if the next command is a push, neither data cell would accept an input.

When a pull is issued, each data cell is governed by the value at its DVA port. Assuming again that the illustrated input managers 153 and 154 contain different values, when a pull is issued, the "1" at the DVA port of data cell B 143 causes it to accept data via its parallel in (PIN). If on the other hand, input manager A 154 contained a "0", indicating that data cell A had valid data, data cell B would accept that valid data via its serial in (SIN) port. When the pull is issued without a push, the values stored in the input managers shift one cell down. Thus, the "1" in input manager A exits its V* port and is received at the INB of input manager B.

When pull and push are issued concurrently, there is no change in the input manager contents. The value at the DVA port of a data cell determines through which port that data cell will accept its next data bit. Note that the input manager output V* has four destinations, the DVH, "data valid here", port of the associated data cell, the DVA, "data valid above", port of the data cell which is the immediate successor to the associated data cell, the INA, "input from above", of the immediate successor input manager, and the INB, "input from below", of the immediate predecessor input manager.

The operation of this pair of cells 103 and 104 can be characterized by the following program in MADL, the Multi-Level Architectural Language for system simulation, developed by Hewlett-Packard Company:

```
BLOCK BEH BLOCK BEH dcb
(INPORT
BIT pin;
BIT sin;
BIT psh;
BIT dva;
BIT pl;
BIT dvh;
BIT clk;
BIT cl;
BIT tst;
OUTPORT
BIT sout);
STRUCT temp,tempout;
BEGIN #dcb
IF clk = % b1 THEN #Phase 1
BEGIN
if cl = % b1 then temp: = % b0
else if tst = % b1 then temp: = sin;
else if dvh = % b1 then temp: = pin;
else if pl = % b1 then
begin
if psh = % b1 && dva = % b1 then
temp: = pin;
else
temp: = sin;
end;
else temp: = tempout;
END;
ELSE #Phase 2
BEGIN
tempout: = temp;
sout: = temp;
END;
END; #dcb
BLOCK BEH imb
(INPORT
BIT inb;
BIT ina;
BIT clk;
BIT set;
BIT tst;
BIT pl;
BIT psh;
OUTPORT
BIT v*;
STRUCT temp, tempout;
BEGIN #imb
IF clk = % b1 THEN #Phase 1
BEGIN
if set = % b1 then temp: = % b1;
else if tst = % b1 then temp: = ina;
else if pl = % b! && psh = % b1
then temp: = tempout;
else if pl = % b0 && psh = % b0
then temp: = tempout;
else if pl = % b1 && psh = % b0
then temp: = ina;
else if pl = % b0 && psh = % b1
then temp: = inb;
END;
ELSE #Phase 2
BEGIN
tempout: = temp;
v*: = temp;
END;
END; #imb
(PROGRAM END)
```

This program and the accompanying drawings are simplified in that in most cases, the signals are composite. For example, the clock signal is implemented as ten clock signals. The clock is a two phase clock, so that phase 1 and its complement, and phase two and its complement are provided. An additional phase 1 clock is provided due to routing constraints to the data cells. A duplicate set of signals is then directed to the input manager cells. Likewise, most of the other signals include the listed signal and its complement.

The operation of FIFO shift register 100 of FIG. 1, is further explained in connection with the timing diagram of FIG. 3 in which CLK[0] is the clock's phase 1 input to the FIFO shift register, CLK [1] is the clock's phase 2 input, CL is the "clear" input, PSH is the "push" input, PL is the "pull" input", FDIN is the flux data input, FDOUT is the "flux data out" of the FIFO shift register, and EMPTY is the "empty" output.

The sequence depicted in FIG. 3 is as follows:

1. (0–0.75 μS) During the first three cycles, clear is asserted and the FIFO shift register is forced into an empty state. Clear does not need to be asserted for this long. One cycle is enough.

2. (0.75–1.0 μS) Then, a "1" is pushed. Empty goes away before the next clock cycle.

3. (1.0–1.5 μS) Then a "0" is pushed.

4. (1.25–1.5 μS) Then, a pull is asserted. Note that the "1" at the output disappears at the end of phase 1 of the clock (clk[0] high) and is replaced by the next bit in the FIFO shift register, a "0".

5. (1.5–1.75 μS) Another pull is asserted. The "0" disappears at the end of phase 1 of the clock as in the previous pull. Empty goes true at the same time, indicating that the value of "FDOUT" is not valid.

6. (1.75–2.0 μS) Then, another "1" is pushed, empty goes false.

7. (2.0–2.25 μS) Then, a "0" is pushed simultaneously with pull being asserted. Note that the "1" that was just pushed is removed from the FIFO shift register output and is replaced by the next bit, a "0". Empty stays low, because the "0" at the output is valid, and has not yet been removed.

8. (2.25–2.5 μS) Another "1" is pushed.

9. (2.5–2.75 μS) A "0" is pushed simultaneously with pull being asserted. This time, the "0" is taken from the output and replaced by the "1" put in after it. As this procedure finishes, the FIFO shift register contains two bits: a "1" followed by a "0".

In order to facilitate interfacing, the FIFO shift registers 100 and 200 of FIG. 1 provide four output signals: "FDOUT" is a convention flux data out signal; "EMPTY" indicates that no valid data is available for output, and is generally used by interfaced devices to inhibit the assertion of a pull; "OVER" indicates all cells have valid data, and, therefore, that an overflow error may have occured; and "FULL" is used to initiate actions to be taken before an overflow error is encountered. In the illustrated FIFO shift registers 100 and 200 of FIG. 1, "FULL" is the V* output of the third to last cell, e.g. cell 130 in FIFO shift register 100.

These "FULL" or "almost full" signals are combined across FIFO shift registers in FIFO bank 99. The FULL output from cell 130 is directed to gate 161 which stores the logic sum of its FULLIN input, which is tied to ground, and the inverse of the V* output of cell 130. This sum is available at the FULLIN input of gate 162 where it is logically ORed with the inverse of the V* output of cell 230. The result is an "any full?" signal which indicates whether either of the two FIFO shift registers is full. Accordingly, three full signals are made available for interfacing, one for each FIFO shift register 100, 200, and a logically ORed signal that signifies if either of the shift registers is full.

As incorporated in the tape drive read circuitry 300 of FIG. 4, nine FIFO shift registers provide nine individual FULL signals and an ORed composite, yielding a 10-bit signal at 301. One FIFO shift register 302 is shown with the "OVER", push, pull, empty, and flux data input and output lines.

The flux data input to the FIFO shift registers of FIG. 4 is shown originating from a 9-track magnetic tape 303 passing over a read head 305. The read head 305 converts magnetic flux levels to electrical signal levels and directs them to analog read circuitry 307. The nine channels of flux data output from the analog read circuitry are digitized by a bank 309 of nine phase locked loops (PLL) 311.

The PLL bank 309 provides nine channels of multiplexed flux data and validity signals. Upon demultiplexing, an active validity signal is treated as a "push" signal to the respective FIFO shift register. That is, on one half cycle, a validity signal is issued which indicates whether or not the data represented on the following half cycle, on the same line, is to be pushed into the respective FIFO shift register. The timing for this clock cycle is governed and indicated by a phase/select signal provided by the incorporating read system and synchronized to the main system clock of the read circuitry.

The phase/select and flux data/validity signals are input to a monolithic VLSI de-skew/read circuit 313. An included demultiplexer 315 filters the incoming data/validity signal to filter out invalid data, and issues push (PSH) signals to the FIFO shift registers 302 as valid data is transmitted on a track-by-track basis.

The de-skew/read circuit 313 is governed by a master clock, not shown because of its pervasiveness. The master clock is the source of the clock input to the FIFO shift registers as well as to the de-skew and mark detect section 317 and the read/format section 319 of the de-skew/read circuit 313. Additionally, the master clock provides synchronization of the phase/select signal from the PLL bank 309.

While the 9-tracks of flux data output from the PLL bank 309 are synchronized with respect to the master clock, they are not generally synchronous with respect to each other. Relative mechanical misalignment of the read head and the tape path, and distortions of the tape due to drive forces and fatigue cause bits originally written synchronously to by read at slightly different times.

At the high bit densities used in high-performace tape drives, these small time differentials can cause, for example, bit one of track one to be concurrent with bit 3 of track 5. In order to be able to reliably decode data being read from a tape, de-skew circuitry is provided. In the illustrated embodiment, the de-skew and mark detect section identifies data block boundaries and synchronization marks written onto the tape on each track.

When a predetermined mark is found in one track, the de-skew circuitry disables the normally active "PULL" signal. Since this prevents data from exiting a FIFO shift register without preventing data from entering, the respective FIFO shift register starts to fill. As the FIFO shift register is filling, the de-skew and mark detect circuitry seeks corresponding marks in the other tracks. Assuming the sought mark is found for all tracks, or a sufficient number of tracks for error correction purposes, before any FIFO shift register issues a FULL signal, this procedure permits successful deskewing. In the event insufficient sought marks are detected prior to one of the tracks filling, then the de-skew circuitry performs further corrective action in response to the generated "any full", "this track full" and mark detects and in accordance with the implemented de-skew strategy.

When the attempt to locate a mark in sufficient tracks fails, a validity strobe is held inactive and the READ/FORMAT section discards the received flux data input. Otherwise, the READ/FORMAT section formats the valid input, discards non-data flux inputs, such as synchronization and other marks, and corrects the received data according to implemented error correction schemes, and outputs 8-bit data, which can include a parity bit, to a system processor (not shown). An end of data (EOD) signal is also provided to mark data boundaries for the processor.

The disclosed FIFO shift registers are readily adapted for alternative modes of operation by virtue of the fact that the manager cells can be read and programmed. For example, the contents of the input manager cells can be read by capturing the V* outputs for each input manager cell, or by stepping out the commands serially by issuing PSH without PL commands and monitoring the OVER signal, or by issuing PL without PSH signals and serially monitoring the EMPTY output.

Likewise, the input manager cells can be programmed by controlling the level at INB of the bottommost input manager cell, e.g. 101, as PSH without PL signals are issued, or by controlling the level at INA of the topmost input manager cell, e.g. 132, as PL without PSH are issued. By programming the input manager cells and by tying PSH and PL signals together, a programmable length shift register is provided.

The fact that the FIFO shift register structures disclosed provide for alternative use as programmable and readable fixed length shift registers can enhance the flexibility of an incorporating drive system. For example, at lower flux densities, dynamic skew can be insignificant, so that only static skew, which can be induced by stable mechanical misalignments, need be addressed. Thus, a calibration tape for a given flux density can be used to determine the skew profile of a particular tape drive system. This skew profile can be read from the respective input manager cells, and stored. When a normal (non-calibration) tape is loaded, this profile can be programmed into the respective input manager cells so that each shift register introduces the delay in its track necessary to ensure that the data is aligned across tracks at the shift register bank output. Of course, there are many other possible uses for the ability to read and program the shift registers.

Due to the provision for synchronized operation of the disclosed FIFO shift register, it can be implemented as shown as part of the monolithic VLSI de-skew/read circuit 313. As a bonus advantage, the demultiplexer, which if conventional FIFO shift registers were used would be excluded from the VLSI chip, can be and is brought within the synchronization boundary 315.

Additionally, the provision for clocked direct injection transfers removes uncertainty in determining when a bit is to be available at output. Thus, during normal operation in the absence of skew, bits input to a FIFO bank concurrently can be removed concurrently at a predictable time. In other words, the present invention provides that data synchronized at the input of the FIFO bank is synchronized at its output. This relieves the system of the need to introduce delays to allow the bits to "line-up" at the output of the FIFO bank, or, in the alternative, to include additional circuitry to correct an asynchronous output.

As a further advantage of the present invention, the direct injection of data into the next available vacancies minimizes "bubble-through" delays. Thus, the disclosed FIFO shift register can easily match the speeds of the interfacing circuitry.

The invention provides for further advantages in other modifications and variations apparent to those skilled in the art. The invention is adaptable to FIFO shift registers of two or more bits in depth, and parallel FIFO banks of any dimension. Furthermore, alternative modes of operation can be provided for by modifying the disclosed circuitry or by providing the appropriate outboard logic. These and other modifications and variations are provided for by the present invention, the scope of which is limited only by the following claims.

What is claimed is:

1. An electronic FIFO comprising:
   means for receiving data inputs;
   means for receiving push signals;
   means for receiving pull signals;
   plural data cells, including a topmost data cell and a bottommost data cell, said data cells being serially arranged so that every data cell other than the topmost data cell has an immediate successor data cell, and every data cell other than the bottommost data cell has an immediate predecessor data cell, each said data cell being adapted for receiving, storing and transmitting binary electrical data, each of said data cells having a parallel input, a serial input and a serial output, the serial output of said bottommost data cell serving as the output of said FIFO;
   means associated with each of said successor data cells for receiving, through its serial input, data stored within the respective predecessor data cell through the latter's serial output;
   parallel input means for directing data received via said data receiving means to the parallel input of each of said data cells; and
   input manager means responsive to push and pull signals received via said means for receiving push signals and said means for receiving pull signals, said input manager being adapted for individually controlling each data cell with respect to whether that data cell is to receive data, and, if so, through which input.

2. The FIFO of claim 1 wherein each said data cell has a clock input so that data transfers into and from data cells can occur synchronously.

3. The FIFO of claim 2 further comprising additional series of data cells, each series including a respective topmost data cell and a bottommost data cell, said series being operated synchronously with respect to each other.

4. The FIFO of claim 1 wherein said input manager means includes a bi-directional shift register with plural manager cells, each manager cell being associated with a respective of said data cells, said manager cells including a topmost manager cell, and a bottommost manager cell, each manager cell other than said topmost manager cell having a respective predecessor manager cell, each manager cell other than said bottommost manager cell having a respective predecessor manager cell.

5. The FIFO of claim 4 wherein each manager cell is adapted for storing status information, each manager cell including a status output for transmitting stored status information, each successor manager cell having a shift down input for receiving status information from the status output of the associated predecessor manager cell, each predecessor manager cell having a shift up input for receiving status information from the status output of the associated successor manager cell.

6. The FIFO of claim 5 wherein said input manager means controls each successor data cell according to the status of the associated manager cell, the predecessor manager cell of the associated manager cell and received push and pull signals.

* * * * *